(12) United States Patent
Blejer

(10) Patent No.: US 11,510,373 B2
(45) Date of Patent: Nov. 29, 2022

(54) USER INTERFACE FOR A COMPUTERIZED CROP GROWING MANAGEMENT SYSTEM AND METHOD

(71) Applicant: Netafim, Ltd., Tel Aviv (IL)

(72) Inventor: Iosi Blejer, Kibbutz Magal (IL)

(73) Assignee: Netafim, Ltd., Tel Aviv (IL)

( * ) Notice: Subject to any disclaimer, the term of this patent is extended or adjusted under 35 U.S.C. 154(b) by 162 days.

(21) Appl. No.: 16/899,871

(22) Filed: Jun. 12, 2020

(65) Prior Publication Data

US 2020/0305367 A1    Oct. 1, 2020

Related U.S. Application Data

(63) Continuation of application No. PCT/IB2018/059912, filed on Dec. 12, 2018.

(60) Provisional application No. 62/597,822, filed on Dec. 12, 2017.

(51) Int. Cl.
| | | |
|---|---|---|
| *A01G 25/16* | (2006.01) | |
| *G06F 9/451* | (2018.01) | |
| *G06Q 10/06* | (2012.01) | |
| *G06Q 50/02* | (2012.01) | |

(52) U.S. Cl.
CPC .......... *A01G 25/167* (2013.01); *G06F 9/451* (2018.02); *G06Q 10/0631* (2013.01); *G06Q 50/02* (2013.01); *G05B 2219/2625* (2013.01)

(58) Field of Classification Search
None
See application file for complete search history.

(56) References Cited

U.S. PATENT DOCUMENTS

| | | | |
|---|---|---|---|
| 4,015,366 A | 4/1977 | Hall, III | |
| 4,760,547 A | 7/1988 | Duxbury | |
| 5,085,076 A * | 2/1992 | Engelmann | ........... G01F 15/125 |
| | | | 73/198 |
| 5,173,855 A | 12/1992 | Nielsen et al. | |

(Continued)

FOREIGN PATENT DOCUMENTS

| | | | |
|---|---|---|---|
| CN | 1586125 | 3/2005 | |
| WO | WO 2017/066834 | 4/2017 | |
| WO | WO-2017066834 A1 * | 4/2017 | ............. A01G 25/16 |

OTHER PUBLICATIONS

Anand et al., "Automatic Drip Irrigation System Using Fuzzy Logic And Mobile Technology," IEEE, 2015, 5pg. (Year: 2015).*

(Continued)

*Primary Examiner* — Ryan D. Coyer
(74) *Attorney, Agent, or Firm* — Womble Bond Dickinson (US) LLP

(57) ABSTRACT

A computerized crop growing management system (CMS) for a farm includes a main controller with an associated user interface (UI). The farm has a plurality of fields on each of which a different crop may be raised, each crop having different irrigation and nutrient requirements. Each field is fed by a main irrigation line connected to a network of irrigation pipes having controller-based valves. Sensors monitor growing conditions in each field. The UI is configured to permit an operator to monitor growing conditions, and control the supply of irrigation liquid and nutrients to each field and/or each crop. The UI allows the operator to specify and create irrigation schedules, nutrient recipes and flow rates, as well as warn an operator of technical and crop problems.

10 Claims, 18 Drawing Sheets

(56) References Cited

U.S. PATENT DOCUMENTS

| | | | |
|---|---|---|---|
| 5,444,611 A * | 8/1995 | Woytowitz | A01G 25/16 137/624.2 |
| 5,566,069 A | 10/1996 | Clark, Jr. et al. | |
| 5,771,169 A | 6/1998 | Wendte | |
| 6,076,740 A | 6/2000 | Townsend | |
| 6,892,114 B1 * | 5/2005 | Addink | A01G 25/16 137/78.2 |
| 6,950,728 B1 | 9/2005 | Addink et al. | |
| 10,772,268 B2 * | 9/2020 | Klein | G06Q 10/06315 |
| 2001/0016788 A1 | 8/2001 | Hauwiller et al. | |
| 2002/0020441 A1 | 2/2002 | Addink | |
| 2002/0066810 A1 * | 6/2002 | Prandi | A01G 25/16 239/728 |
| 2003/0183018 A1 | 10/2003 | Addink et al. | |
| 2004/0128045 A1 | 7/2004 | Benneweis | |
| 2004/0181315 A1 | 9/2004 | Cardinal et al. | |
| 2005/0171646 A1 * | 8/2005 | Miller | A01G 25/16 700/284 |
| 2006/0027676 A1 * | 2/2006 | Buck | A01G 25/16 239/63 |
| 2006/0030990 A1 | 2/2006 | Anderson et al. | |
| 2006/0102739 A1 | 5/2006 | Ivans | |
| 2010/0256827 A1 * | 10/2010 | Bragg | A01G 25/165 700/284 |
| 2010/0306012 A1 | 12/2010 | Zyskowski et al. | |
| 2011/0270448 A1 * | 11/2011 | Kantor | A01G 25/16 700/284 |
| 2013/0085619 A1 | 4/2013 | Howard | |
| 2013/0099022 A9 | 4/2013 | Palmer et al. | |
| 2013/0310992 A1 | 11/2013 | Larsen | |
| 2014/0039696 A1 | 2/2014 | Andrews | |
| 2014/0236868 A1 * | 8/2014 | Cook | G06Q 50/02 705/412 |
| 2014/0343737 A1 | 11/2014 | Nguyen | |
| 2014/0343855 A1 * | 11/2014 | AghaKouchak | G01W 1/10 702/3 |
| 2015/0032272 A1 | 1/2015 | Neesen et al. | |
| 2015/0106237 A1 | 4/2015 | Lorenz et al. | |
| 2015/0313098 A1 | 11/2015 | Halahan et al. | |
| 2016/0235021 A1 | 8/2016 | Neesen et al. | |
| 2017/0020089 A1 | 1/2017 | Endrizzi et al. | |
| 2017/0295415 A1 | 10/2017 | Oezdemir et al. | |
| 2018/0303048 A1 | 10/2018 | Edwards et al. | |
| 2020/0359579 A1 * | 11/2020 | Ersavas | G05B 19/042 |

OTHER PUBLICATIONS

Nof et al., "Handbook of Automation," Springer, 2009, 1841pg. (Year: 2009).*

Tawegoum et al., "Forecasting hourly evapotranspiration for triggering irrigation in nurseries," Elsevier, 2015, 11pg. (Year: 2015).*

International Search Report dated May 14, 2019, in International (PCT) application (No. PCT/IB2018/059912).

Written Opinion dated May 14, 2019, in counterpart International (PCT) application (No. PCT/IB2018/059912).

* cited by examiner

102b ↘

Nutrigation Management  ✕

Determine how much water and what kind of dosing will be applied in this program.

111 — | Watering | Dosing | — 130

Measurement Method — 116
○ By water depth(mm) ◉ By duration(h) ○ By water volume (m³)

Duration:
116b — [ 12 ▾ ] hh : [ 32 ▾ ] mm : [ 32 ▾ ] ss

120 — ⓘ Note: If this program is currently irrigating, the changes you make here will take effect only from the next recurrence of the program.

[ Cancel ]   [ Save ]
   190          192

FIG. 2B

Water Distribution

Manage the shifts on the left panel. Use the right panel to assign valves to a selected shift.

Program: Corn August
4 Shifts (14 valves)

| Name | # of Valves | Flow (m³/h) | |
|---|---|---|---|
| Corn August 1 | 5 | 65 | × |
| Corn August 2 | 7 | 65 | × |
| Corn August 3 | 2 | 64 | × |

⊕ Add Shift

Mainline: North-West
Available Valves: 34 of 52

Search Term 🔍 ≡ ⌗

| | Name ▽ | Shifts ▽ | Irrigation Block | Flow (m³/h) ▽ | |
|---|---|---|---|---|---|
| ☐ | Valve 1 | — | IB-Name | 15 | ⊕ ⌗ |
| ☐ | Valve 2 | Corn August 1 | IB-Name | 15 | ⊕ ⌗ |
| ☐ | Valve 3 | — | IB-Name | 5 | ⊕ ⌗ |
| ☑ | Valve 4 | — | IB-Name | 10 | ⊕ ⌗ |
| ☐ | Valve 5 | Corn August 3 | IB-Name | 25 | ⊕ ⌗ |
| ☑ | Valve 6 | — | IB-Name | 25 | ⊕ ⌗ |
| ☐ | Valve 7 | — | IR-Name | 5 | ⊕ ⌗ |

Shift: Corn August 4
5 Valves Selected

Summed Flow: 65 m³/h
Available: 5 m³/h
Maximum Capacity: 70 m³/h

[Cancel] [Save]

ⓘ Note: If this program is currently irrigating, the changes you make here will take effect only from the next recurrence of the program.

Water Distribution

Manage the shifts on the left panel. Use the right panel to assign valves to a selected shift.

Program: Corn August
4 Shifts (19 valves)

| Name | # of Valves | Flow (m³/h) | |
|---|---|---|---|
| ■ Corn August 1 | 5 | 65 | × |
| ■ Corn August 2 | 7 | 65 | × |
| ■ Corn August 3 | 2 | 64 | × |
| ■ Corn August 4 | 5 | 65 | × |

⊕ Add Shift

Mainline: North-West — 30
Available Valves: 34 of 52      Search Term 🔍 ≡

| Name ▽ | Shifts ▽ | Irrigation Block | Flow (m³/h) ▽ |
|---|---|---|---|
| ☑ Valve 1 | — | IB-Name | 15   ⓘ ▭ |
| ☐ Valve 2 | Corn August 1 | IB-Name | 15   ⓘ ▭ |
| ☐ Valve 3 | — | IB-Name | 5    ⓘ ▭ |
| ☑ Valve 4 | Corn August 2 | IB-Name | 10   ⓘ ▭ |
| ☐ Valve 5 | Corn August 3 | IB-Name | 25   ⓘ ▭ |
| ☑ Valve 6 | Corn August 2 | IB-Name | 25   ⓘ ▭ |
| Valve 7 | — | IB-Name | 5    ⓘ ▭ |

Shift: Corn August 4
5 Valves Selected

Summed Flow: 65 m³/h
Available: 5 m³/h
Maximum Capacity: 70 m³/h

[Cancel]  [Save] — 192
           190

ⓘ Note: If this program is currently irrigating, the changes you make here will take effect only from the next recurrence of the program.

| ⓘ Soil too dry in Corn Plot 5 | | ✕ |
|---|---|---|
| Basic Information 622 | | Status Active |
| Alert Type | Dry Soil | |
| Source | Tensiometer 30cm depth | |
| Time | 2017-Jan-03 12:24 | |
| Cluster | B | |
| Category | Soil moisture | |
| Location | Corn plot 5 Go to map | |
| Advanced 624 | | |
| Description | Soil tension above 30 cbar | |
| Cause | Insufficient irrigation | |
| [<] [>] | | Clear Alert |

FIG. 6C

USER INTERFACE FOR A COMPUTERIZED CROP GROWING MANAGEMENT SYSTEM AND METHOD

RELATED APPLICATIONS

This is a Bypass Continuation of International Application No. PCT/IB2018/059912 filed Dec. 12, 2018, and published as WO 2019/116243A1. Priority is claimed to U.S. Provisional Patent Application No. 62/597,822 filed Dec. 12, 2017. The contents of the aforementioned applications are incorporated by reference in their entirety.

TECHNICAL FIELD

Embodiments of the invention relate to controlled crop growing in agriculture and landscaping, and in particular, to crop growing management.

BACKGROUND

Nowadays crop growing management, including management of irrigation and/or climate control, is an important part of agriculture and landscaping. Problems related to controlled crop growing have been recognized in prior art and various systems have been developed to provide a solution, for example:

U.S. Pat. No. 4,015,366 (Hall, III) entitled "Highly Automated Agricultural Production System".

U.S. Pat. No. 4,760,547 (Duxbury) entitled "Remote Controlled Multi-Station Irrigation System with DTMF Transmitter".

U.S. Pat. No. 5,566,069 (Clark, Jr., et al.) entitled "Computer Network for Collecting and Analyzing Agronomic Data".

U.S. Pat. No. 5,173,855 (Nielsen et al.) entitled "Distributed Multiple Irrigation Controller Management System".

U.S. Pat. No. 5,771,169 (Wendte) entitled "Site-Specific Harvest Statistics Analyzer".

U.S. Pat. No. 6,076,740 (Townsend) entitled "Irrigation Control System".

U.S. Pat. No. 6,950,728 (Addink et al.) entitled "Interactive Irrigation System".

US Patent Application No. 2001/0016788 (Hauwiller et al.) entitled "System and Method for Creating Agricultural Decision and Application Maps for Automated Agricultural Machines".

US Patent Application No. 2002/0020441 (Addink) entitled "Irrigation Controller".

US Patent Application No. 2003/0183018 (Addink et al.) entitled "Flow Meter as an Irrigation Management Tool".

US Patent Application No. 2004/0181315 (Cardinal et al.) entitled "Irrigation System".

US Patent Application No. 2006/0030990 (Anderson et al.) entitled "Method and System for Estimating an Agricultural Management Parameter".

Chinese Patent Application No. 1586125 (Chen) entitled "Managing and Control System for Crops in Greenhouse".

US Patent Application No. 2015/0032272 (Neesen et al.) entitled "Control System for an Irrigation System" discloses a graphical user interface for controlling and monitoring an irrigation system for crops.

US Patent Application No. 2010/0306012 (Zyskowski et al.) entitled "System and Method for Managing and Predicting Crop Performance" discloses a graphical user interface for controlling and monitoring an irrigation system for crops.

US Patent Application No. 2014/0343737 (Nguyen) entitled "Techniques for Controlling Fluid Distribution" discloses a graphical user interface for controlling and monitoring an irrigation system for crops.

US Patent Application No. 2013/0099022 (Palmer et al.) entitled "Electronic Irrigation System Software" discloses irrigation control software that provides a graphical user interface for creating an irrigation scheduling control interface.

US Patent Application No. 2014/0039696 (Andrews) entitled "Irrigation System Including a Graphical User Interface" discloses a system for managing irrigation equipment for applying water to different areas, along with a user interface which enables a user to configure the control system.

US Patent Application No. 2017/0020089 (Endrizzi et al.) entitled "Systems, Methods, and Devices for Dynamic Irrigation with User Adjusted Control" discloses employing a dynamic watering schedule to determine watering times, based on user input thorough a graphic user interface.

US Patent Application No. 2017/0295415 (Oezdemir et al.) entitled "Agricultural Production Monitoring" discloses a system which collects sensor data associated with growing conditions for crops, accepts additional data from a user, and generates analyzed data.

The above-identified patents and patent applications are incorporated by reference in their entirety to understand irrigation systems in general, and user interfaces for such irrigation systems.

SUMMARY

The subject matter of the present application pertains to a farm having a computer-controlled irrigation system with an internet-enabled computer operatively connected to a main controller of the irrigation system. The irrigation system includes a plurality of mainlines. A "mainline" defines infrastructure laid in the farm that can feed irrigation to various zones/areas in the field. In includes e.g. a main delivery pipe (e.g., made of PVC), valves along the pipe, fertigation devices that can insert fertilizers into the water flowing downstream, pumps, etc. Downstream of the "mainline" exist irrigation systems that the farmer already laid down to irrigate his fields. Such irrigation system may include drip lines, sprinklers, etc. A farmer or other operator has knowledge of all this infrastructure in the farm's fields.

A single crop may be grown in a given field, though it is also possible to have multiple crops in a given field. Each crop must be supplied with water and/or nutrients throughout the growing season, and each crop generally will have different requirements as to frequency, quantity and chemical properties of water and nutrients to be supplied. The fields and/or equipment are provisioned with sensors, such as moisture, temperate, pH and other sensors.

The present invention is directed to a user interface for such a farm. The user interface enables the farmer ("operator") to specify, schedule and monitor irrigation and crop growth in the various fields.

In one aspect, the user interface allows an operator to set up a new crop irrigation specification for specifying water and nutrients to be delivered, to where these are to be delivered, and when they are to be delivered.

In another aspect, the user interface permits an operator to allocate a mainline's water capacity over time and space by scheduling when particular valves associated with a given mainline are turned on or off, to thereby ensure that all crops in a given field supplied by that mainline are adequately supplied with water and nutrients.

In yet another aspect, the user interface is configured to simultaneously display past information regarding soil, moisture and other conditions, as well as predict future conditions using well-established models known to those in the field of irrigation-based horticulture.

The user interface comprises a plurality of software components, including a crop irrigation specification software component, a download software component, a crop model utility software component, a map display software component, a watering recommendation software component, a farm status software component, a calendar software component and an alerts software component, all of whose functions are described below.

BRIEF DESCRIPTION OF THE DRAWINGS

The subject matter of the present application is described with reference to the following figures in which:

FIGS. 2A & 2B show watering screens of the user interface.

FIGS. 3A-3C show various water distribution screens for an irrigated area.

FIG. 6C shows alert details for a crop alert of FIG. 6B.

DETAILED DESCRIPTION

The above-identified patents and patent applications are incorporated by reference in their entirety.

Figure 8:
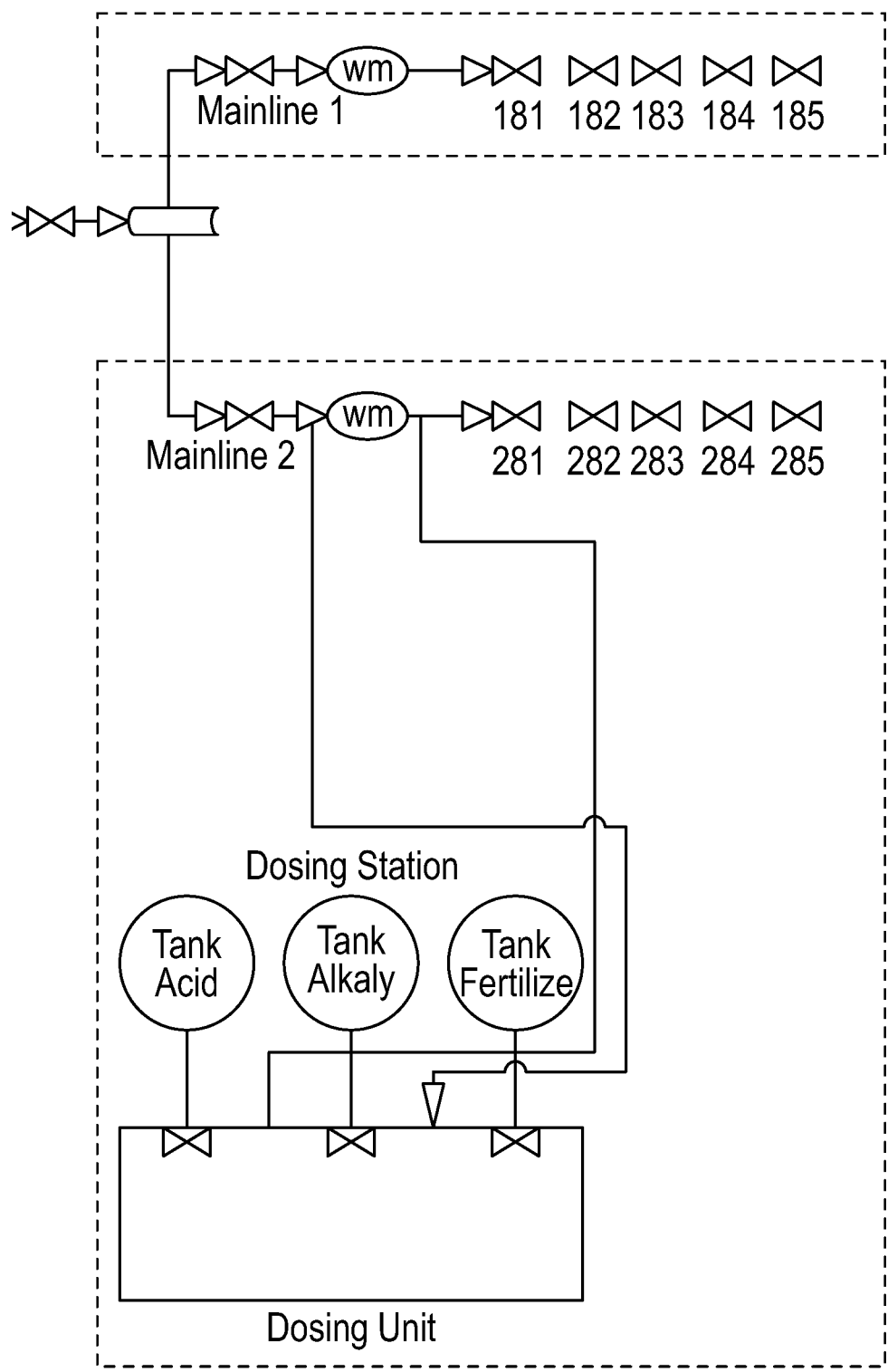
FIG. 8 shows an exemplary irrigation system having two main lines.

In the exemplary irrigation system of FIG. 8, a water source supplies water to a junction, downstream of which two mainlines are shown. Each mainline connects to a plurality of valves, and each valve may control fluid through an irrigation line (not shown) connected to irrigation elements (also not shown). In the exemplary environment of FIG. 8, only one of the two mainlines connects to a nutrient dosing system.

Figure 1:
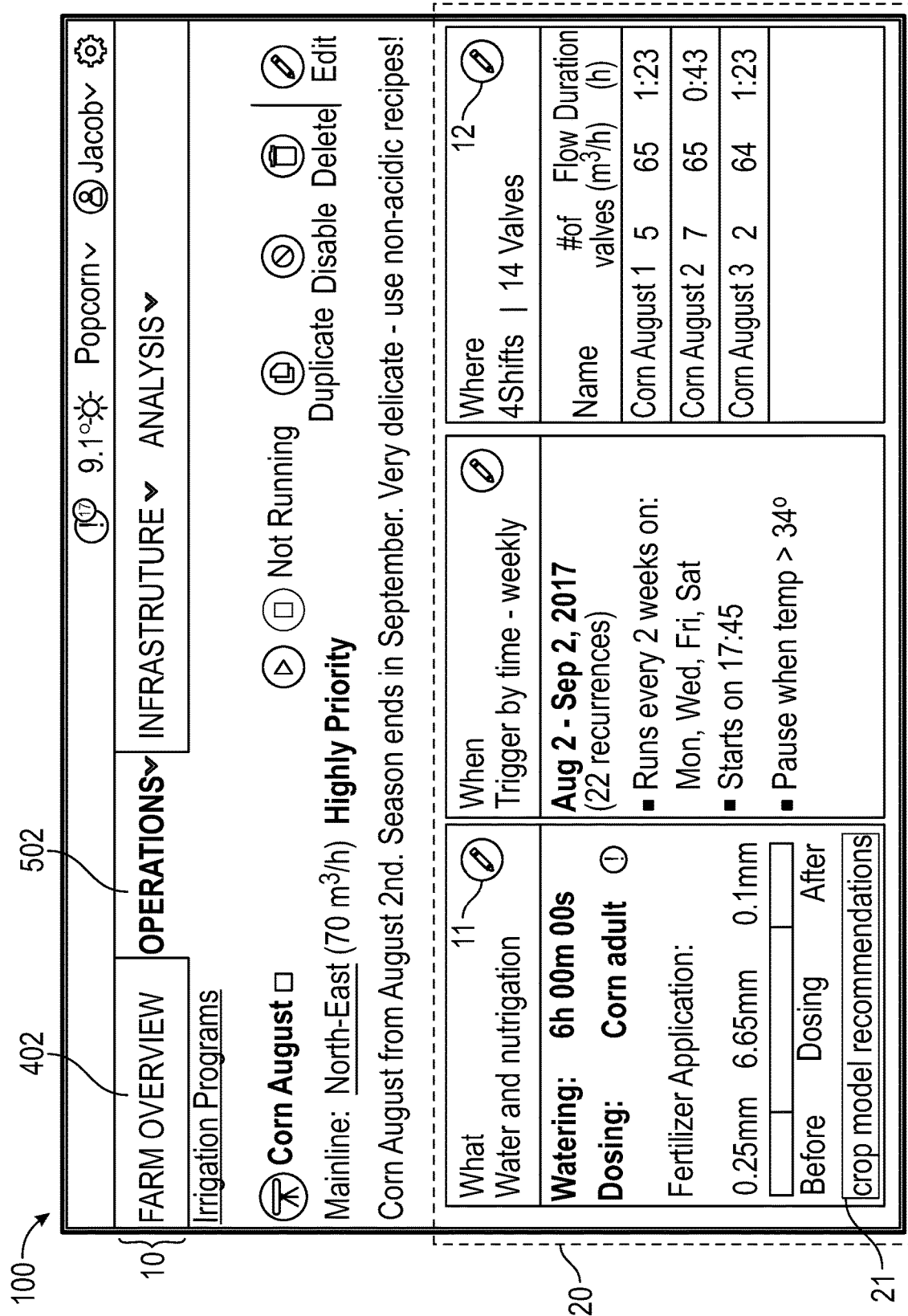
FIG. 1 shows the main screen of a user interface.

Attention is first drawn to FIG. 1 illustrating a user interface (UI) 100 for actuating and/or controlling an embodiment of a computerized crop growing management system (CMS) of the invention. Generally speaking, the user interface resides in the cloud and is accessed by a browser running on the operator's (farmer's) computer or other internet-connected device. The CMS is configured to control irrigation and feeding of crops in a plurality of discrete fields belonging to a farm. The different fields may have different crops planted at different times.

The illustrated UI 100 includes an upper ribbon 10 including various tabs that an operator of the CMS may toggle between for defining parameters for controlling via the CMS an irrigation system already set in a field or planned to be set in a field for irrigating crops.

At least certain CMS embodiments may be provided with a 'security' functionality defining, e.g., a high-level of security on the server side. For example, a farm manager utilizing a CMS embodiment for controlling irrigation/fertigation (and the like) of his farm—may opt from between several levels of log-in security.

One first possible security level may require e.g. a two-step login sequence—providing high standard of security, suitable for sensitive farms with high level of security standards. The two-step login may require, in addition to a login ID and password, a second password or code sent via email or text to an authorized user. One other possible security level may require login name+password—providing quicker login—possibly suitable for a majority of the growers, who may prefer easier login to the system.

At least certain CMS embodiments may be provided with 'on-line' and 'off-line' options allowing a user to gain advantage of web services while also using possibly 'off-line' in areas where no access to the web may be provided or during temporary disconnections.

The UI of the CMS in this example includes a region 20 where a so-called WWW methodology for controlling the CMS and/or irrigation system(s) controlled by the CMS may be implemented. The WWW methodology includes definitions of 'What' irrigation is to be performed and, if relevant, a dosing recipe, 'When' the irrigation is scheduled to occur and 'Where' on the farm the irrigation is to take place. Collectively, the "What", "Where" and "When" definitions are referred to as a "crop irrigation specification"; a crop irrigation specification software component of the user interface is configured to design a new crop irrigation specification which may thereafter be invoked by an operator.

As seen in the example of FIG. 1, the "What" definition indicates a watering duration of 6 hours, 0 minutes and 0 second, an operator-defined dosing program called "Corn Adult" and the amount of watering before and after dosing.

The "When" definition specifies the time period during which the dosing program is carried out (August 2-September 2) along with the dosing frequency, time of day for dosing, and temperature conditions under which dosing is to be discontinued.

The "Where" definition specifies, for each field to be dosed (field being identified by the crop identifier ascribed by the operator), the number of valves associated with each field, the flow rate (in m3/hr) for the water supply to that field, and the duration of "shifts" needed to meet the irrigation requirements of the field(s) supplied by a given mainline. If a mainline can only supply a certain capacity/amount of water (e.g., X m3/min), and a flow of 1.5× is required to irrigate a field, a first "shift" may be defined to provide X m3/min and then a second "shift" is defined to provide the missing 0.5X m3/min at a later stage (after completion of the X m3/min has been realized. It is understood that a different (and perhaps overlapping) set of valve may be activated for different shifts, even within a single field and/or single mainline.

Figure 2A:
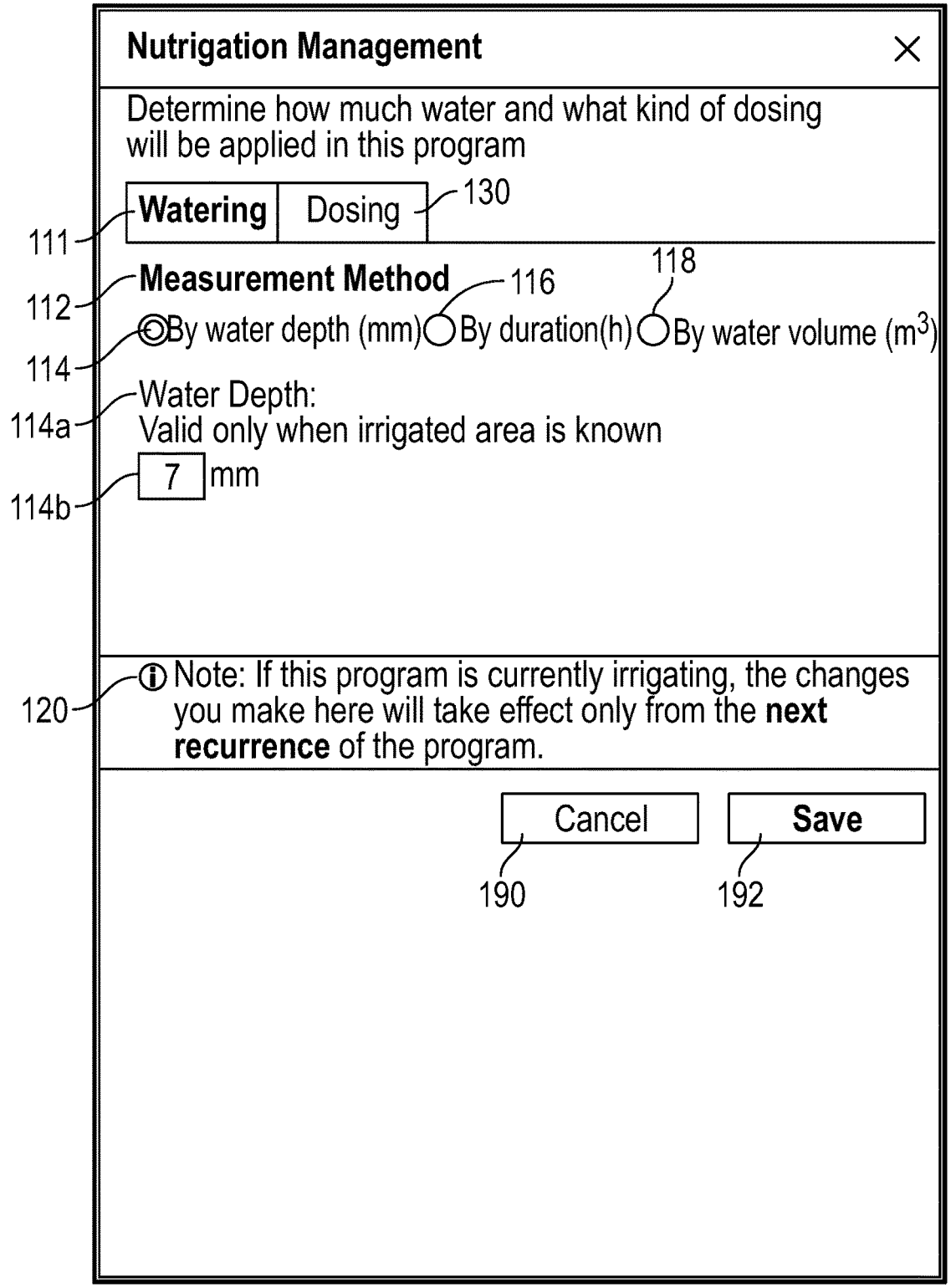

Pressing an edit option 11 of the 'What' definition may open the window/screen 102, illustrated in FIG. 2A, allowing the operator to monitor and/or modify one or more parameters associated with supplying fluids and nutrients to the fields. The operator is able to formulate definitions of what should be provided in an irrigation sequence by choosing between the "watering" and "dosing" tabs 111, 130.

Figure 7:
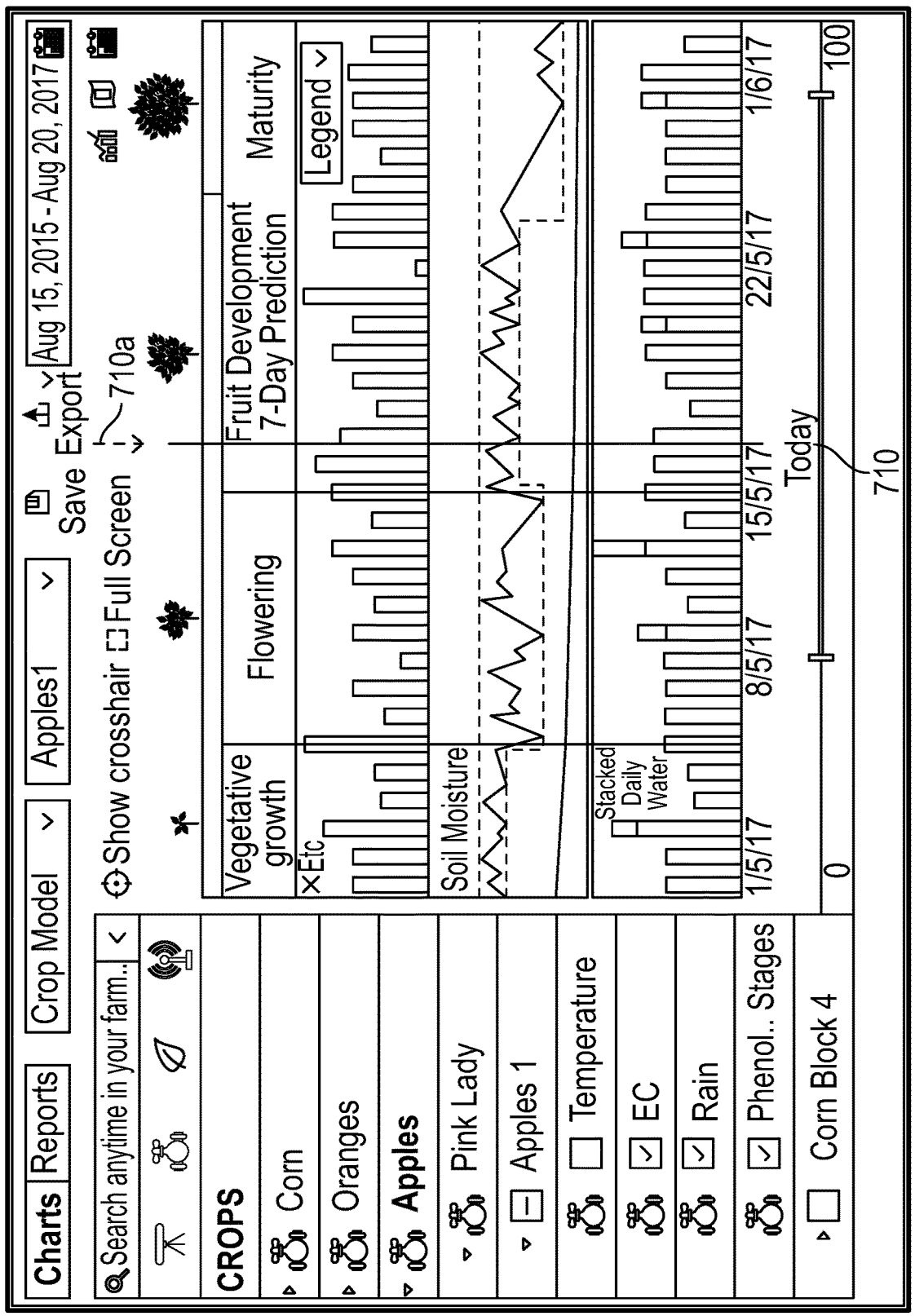
FIG. 7 shows a user interface depicting an overview of near-term past and future crop conditions.

On the user interface of FIG. 1, activating recommendation button 21 may provide a so-called 'crop model' utility, an example of which is provided in FIG. 7.

Based e.g. on specific crop conditions such as soil, water, weather and crop type, a CMS system may provide irrigation recommendations in possibly several levels of fidelity e.g. two such levels. High fidelity recommendations for the near future (the next week or so), may be based on actual measurements and actual registered irrigation events and the weather forecast for the next week. Estimation for the rest of the season may be based on perennial weather information. While editing an irrigation program, the user can click on "crop model recommendations" button 21 to receive guidance as to, e.g., how much water to apply.

In certain embodiments, the 'crop model' utility may be arranged to focus on plant growth possibly with emphasis to irrigation and/or fertigation recommendations. The outputs of this model may be short term rolling recommendations for irrigation and/or fertigation.

FIG. 7 illustrates the output of a crop model utility software component of the user interface. In certain embodiments, as a growing/farming season progresses, actual historic-data related, e.g., to growth condition of crops, weather conditions, resource conditions such as water/fertigation already provided to crops (and the like)—may be accumulated. At least certain 'crop models' may consider such historic-data as a calibrated baseline—upon which forecasts leading into the future may be used. For example, crop or growth related data appearing to the left of the "today" marking 710 in FIG. 7 (see indicated by the dashed arrow 710a) may be such actual historic data—while data to the right of the "today" marking may be estimated forecasted data. Those skilled in the art are familiar with crop model for estimating parameters such as potential crop evopotranspiration (ETc), soil moisture and stacked daily water for each crop or field.

Since data appearing to the left of the "today" marking is real data that was accumulated, e.g., by sensors and the like—such calibration and consideration of the 'historic' data in a crop model may serve for increasing accuracy of future forecasted predictions and/or data being taken into consideration in determining irrigation/fertigation plans for crops.

As seen in FIG. 2, when the "watering" tab 111 has been selected, a nutrition management "watering" screen 102 appears. The screen 102 presents options for defining a measurement method 112 to be used for defining the provision of water. The different measurement methods include approaches such as "by water depth" 114, i.e., millimeters of water to be provided; "by duration" 116 in time scale here of hours; "by water volume" 118 here in cubic meters (etc.). In the shown example, where the "by water depth" option is chosen 114a, a user may define the water depth 114b which, in this example, is chosen to be 7 millimeters. One or more notices 120 may be provided to inform the operator of the update policy for making changes on this screen 102. A "Cancel" button 190 and a "Save" button 192 on this and other screens, allow an operator to selectively discard or accept the selections and changes made.

FIG. 2B illustrates a duration screen 102b which is displayed upon activating the "by duration" button 116. In such case, the duration of irrigation to be provided is defined by hours, minutes and down to a possible resolution of seconds 116a, all as specified by an operator.

Figure 2C:
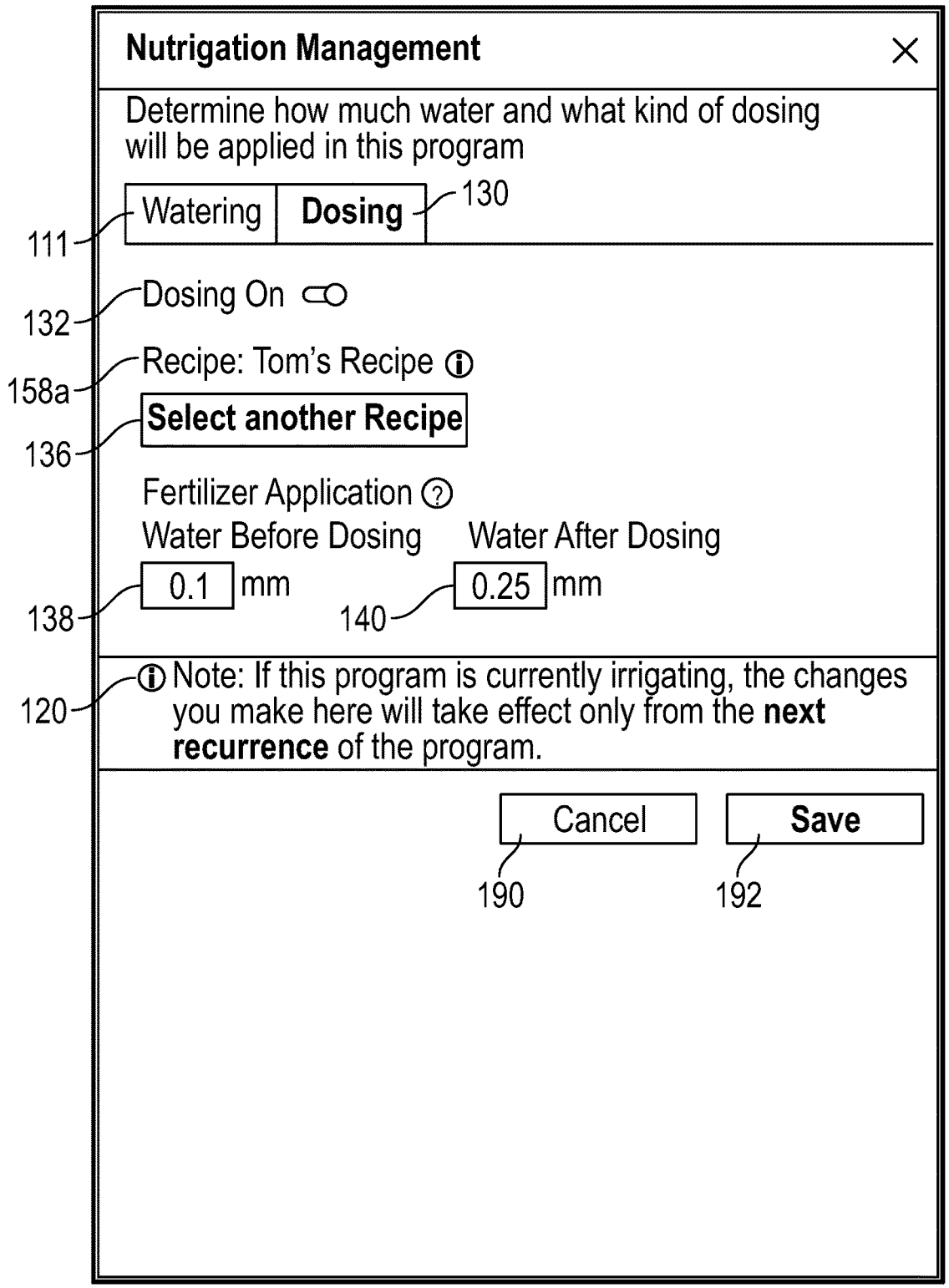
FIGS. 2C & 2D show nutrient dosing screens of the user interface.

FIG. 2C illustrates a dosing screen 102c which gives an example of choosing the "dosing" tab 130. This results in the display of a nutrition management dosing screen 102c. The dosing screen 102c includes a dosing on/dosing off triggering switch 132 which allows an operator to determine whether dosing is enabled. When dosing is enabled, a recipe select button 136 allows an operator to choose from among a plurality of recipes 158a, 158b, 158c, and select parameters such a pre-dosing watering amount 138 and/or a post-dosing watering amount 140 for a selected recipe. A real-time dashboard (not shown) presenting dosing information such as level of EC/pH, opening percentage of each dosing channel, and more may be provided to an operator. Such a real-time view may permit an operator easy optimization of the dosing settings and high level of visibility and control.

Figure 2D:
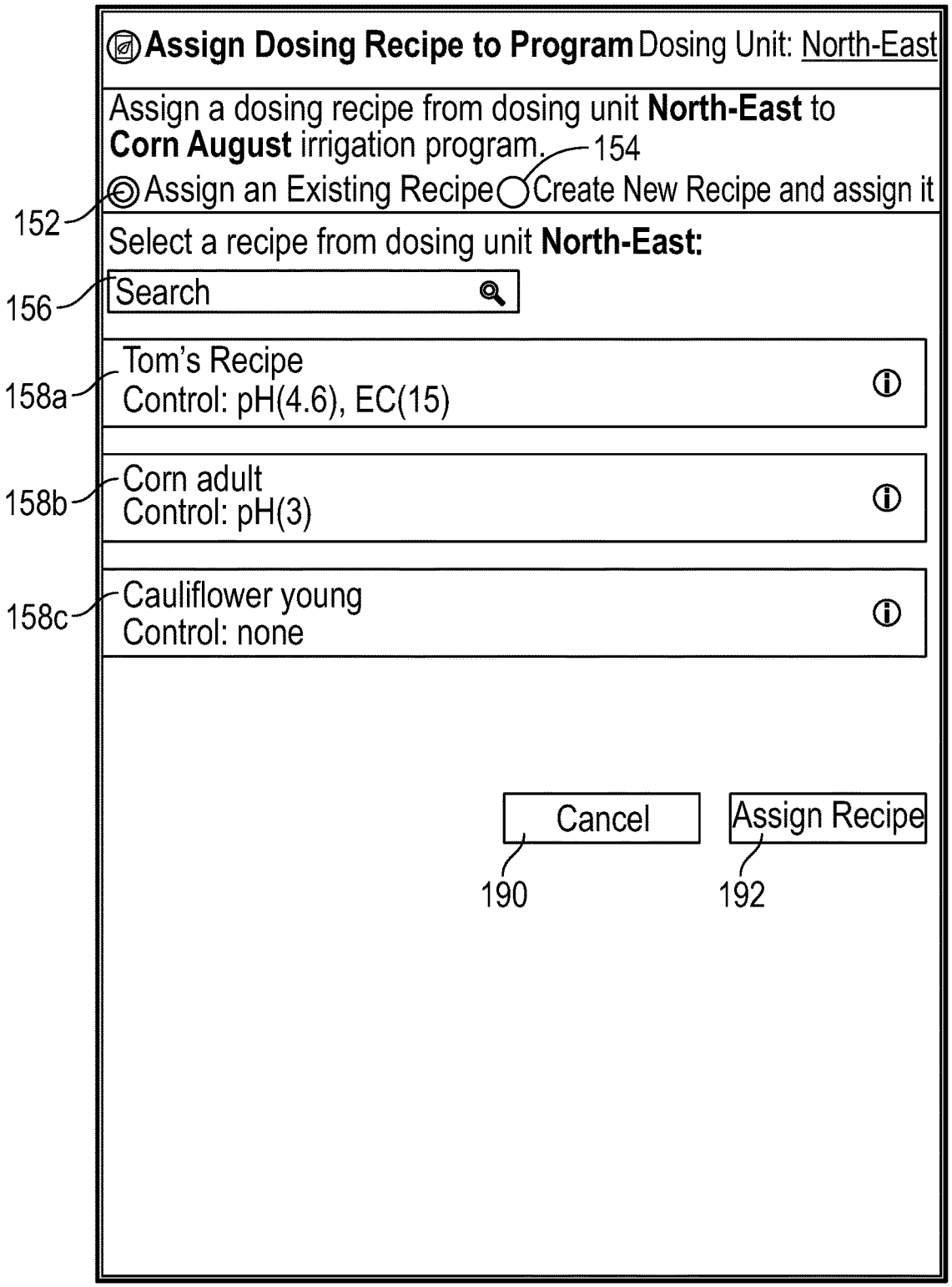

FIG. 2D illustrates a dosing selection screen 102d which is displayed in response to activating the recipe select button 136 of FIG. 2C. The dosing selection screen 102d has a first button 152, which when activated, allows an operator to choose from among a plurality of pre-defined recipes 158a, 158b, 158c, such as by typing their name into a recipe search window 156. The pre-defined recipes may be displayed along with one or more corresponding recipe parameters, such as pH and EC. The dosing selection screen 102d has a second button 154 which when activated, allows an operator to define a new recipe by specify its name and associated parameters.

After creating and saving the "What", "Where" and "When" definitions for a new crop irrigation specification, a download software component associated with the user interface may be activated to download the new crop irrigation specification from the cloud (where the user interface may reside) to the main controller of the irrigation system. If the main controller identifies a problem in a certain device (e.g. missing or malfunctioning valve, water meter, etc.), the operator of the user interface is notified. Otherwise, if all is ok, confirmation is provided that the new crop irrigation specification was successfully downloaded to the controller and the just-defined program can then be executed, as needed.

Figure 3B:
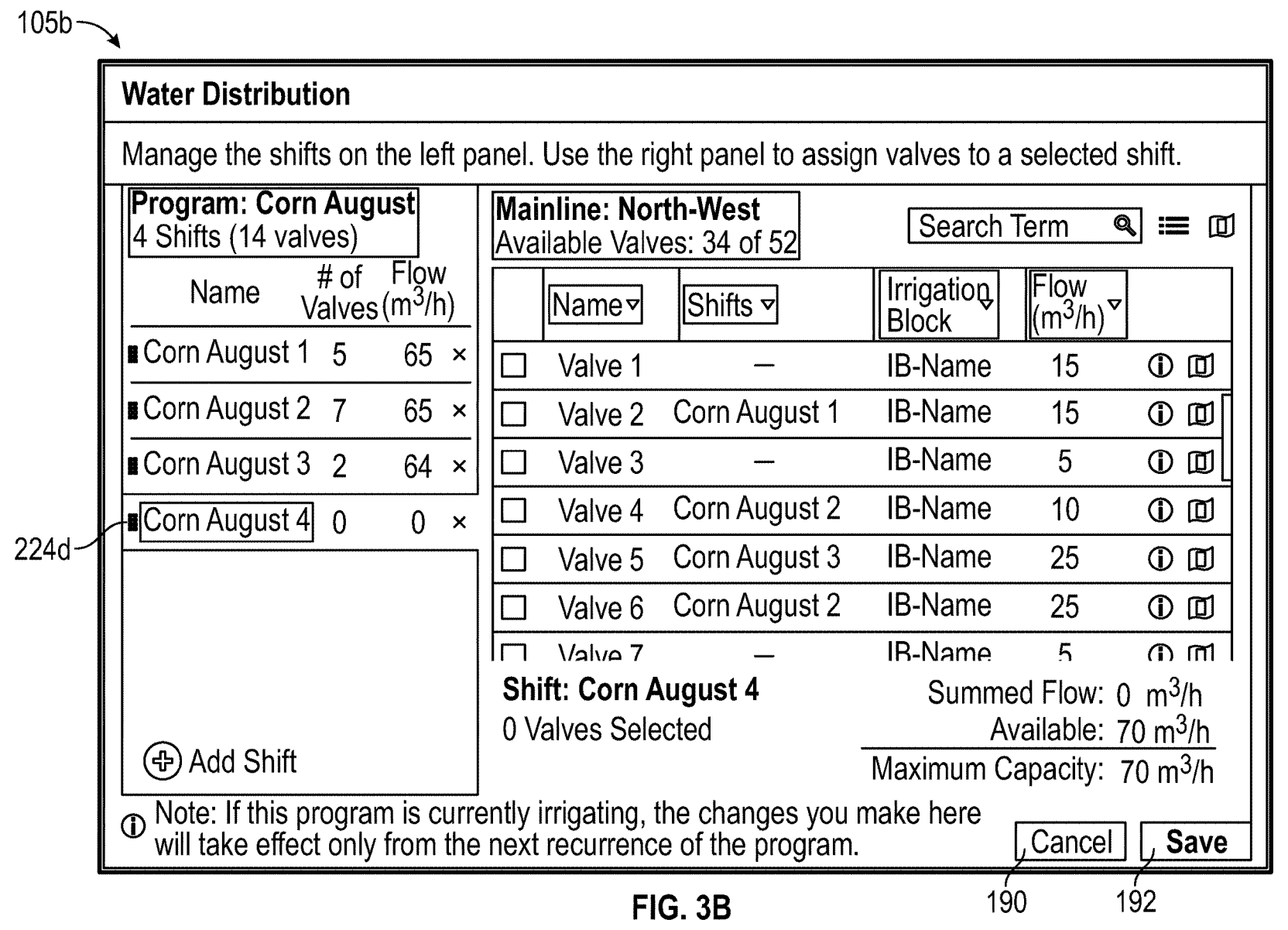

Attention is drawn to FIG. 3A illustrating a current water distribution screen 105a, which is displayed upon activating the "Where" button 12 in FIG. 1, thereby invoking the "where" definition. The principal water distribution screen 105a displays a menu 202 of so-called irrigation shift programs 224 (224a, 224b, 224c) for a given irrigation program scheme (called "Corn August" in the exemplar embodiment shown). The menu 202 provides information regarding the number of valves and flow rate for each shift program. The shift program associated with the named irrigation main line 204 (called "North-West" in this example) may be managed by defining for each such 'program shift' 224, the valves 220 to be controlled by the present computerized crop growing management system (CMS) along with the irrigation blocks 226 in the irrigation system and corresponding flow rates 228 (given here in cubic-meters per hour) to be used. Thus, here access to definitions relating to "Where" irrigation is arranged to occur, may be provided. Activating the "add shift" button 222 option allows an operator to create a new shift program 224d, seen at the lower side of the left panel in FIG. 3B which shows a second water distribution screen 105.

As seen in the right-hand side of the updated water distribution screen 105b of FIG. 3B, available valves and/or irrigation blocks available for this new added 'shift program' 224d are shown.

As seen in the further updated water distribution screen 105c of FIG. 3C, the possible choices of valves and/or irrigation blocks to be included in this new program shift 224d are displayed.

Figure 3D:
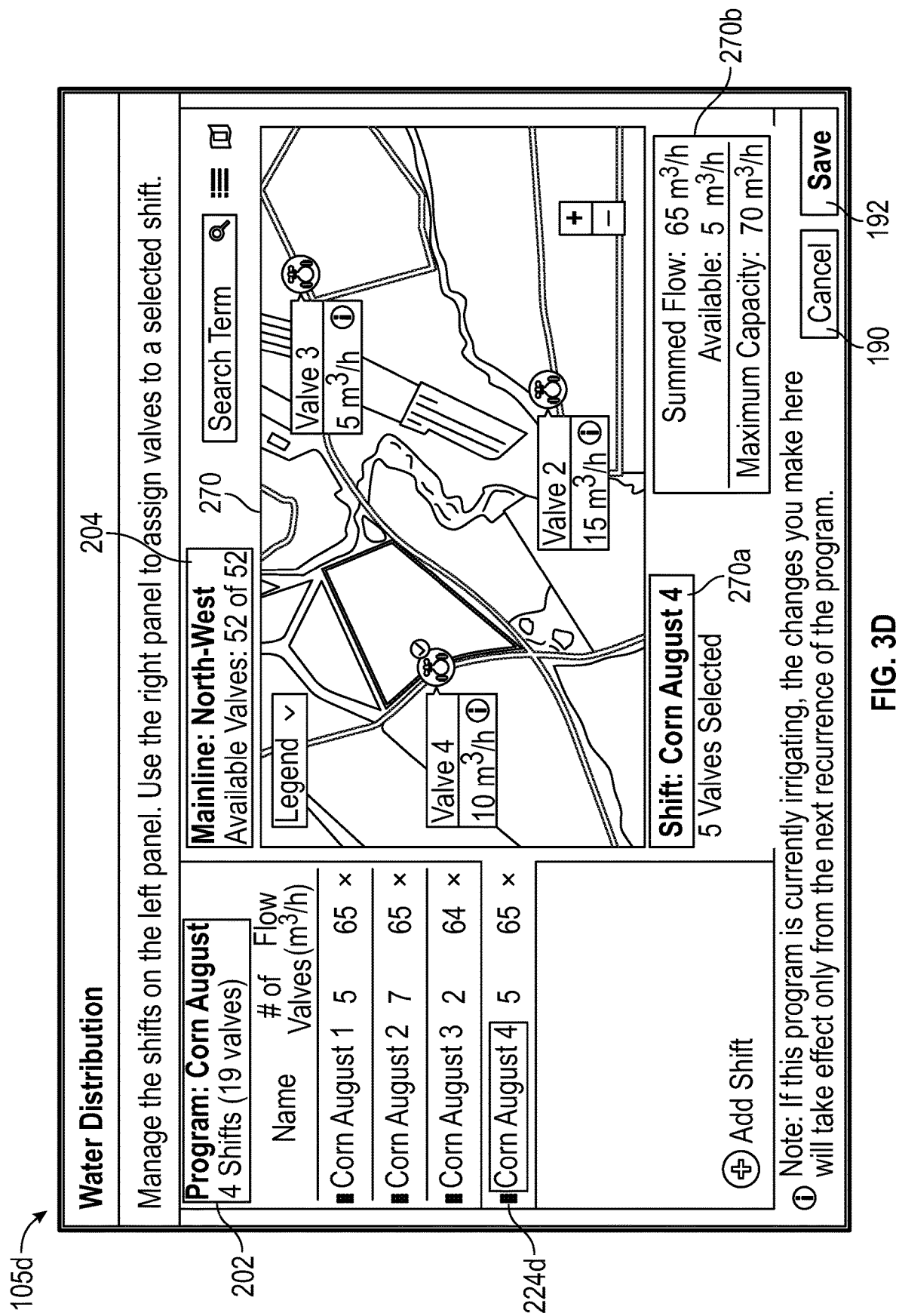
FIG. 3D shows a map screen for an irrigated area.

FIG. 3D shows the effect of activating map button 30 in FIG. 3C. Activating the map button 30 presents a map screen 105d, which displays various information, including a map 270 showing the whereabouts of this just defined irrigation 'program shift' 224d in the irrigation field controlled by the CMS. Such an option provided by map button 30 may be available for any irrigation 'program shift' either already existing or pre-defined or newly defined such as in this example. The map information provided identifies the current program shift 270a along with flow rate information 270b, such as the summed and available flow rates and total flow rate capacity, providing an operator with flow configuration information for the current program shift 270a. Additionally, the map 270 highlights the boundary of each field supplied by one of the valves associated with that program shift 270a within the field of view.

Figure 3E:
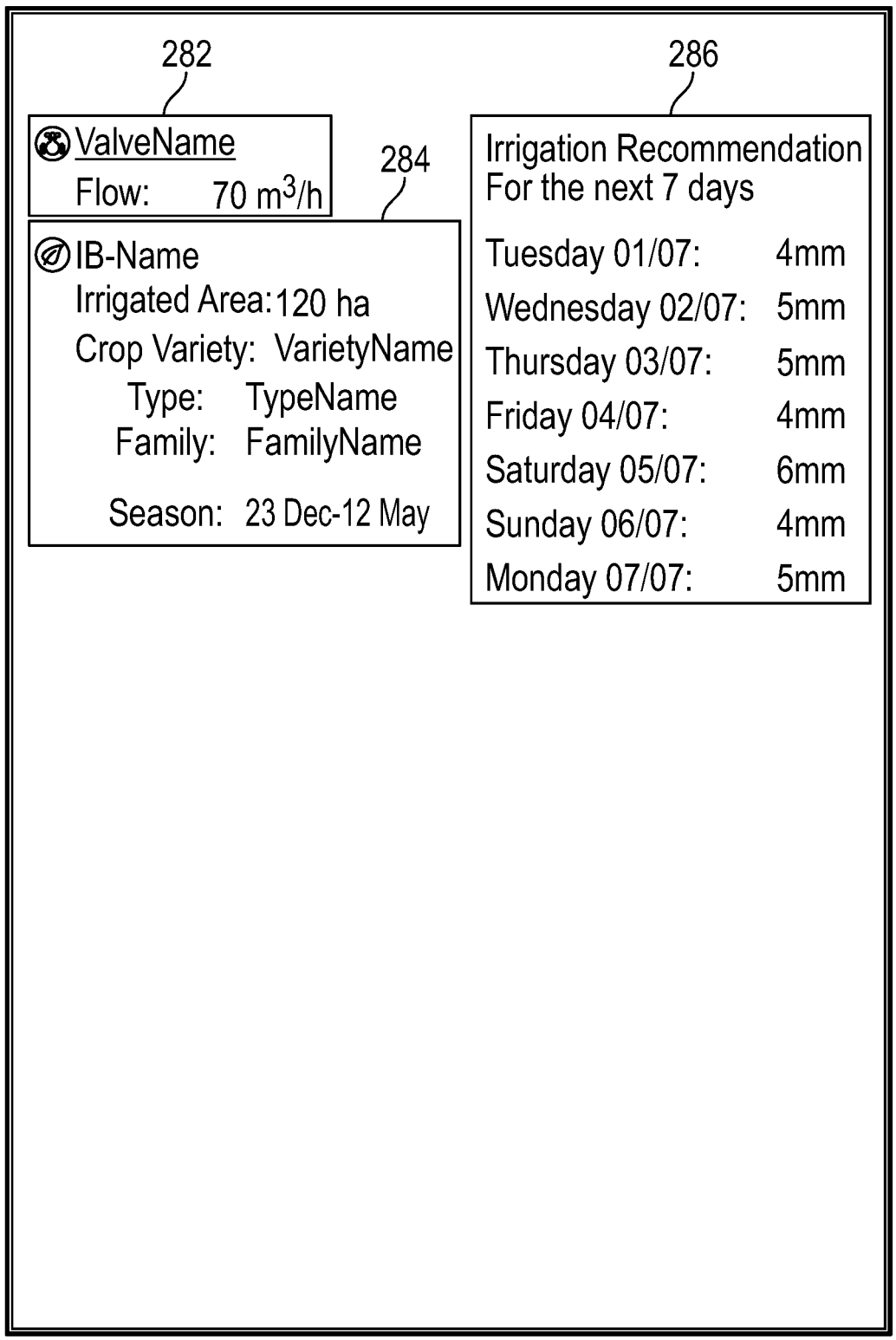
FIG. 3E shows a valve information screen for a particular valve in the irrigated.

Information about parameters and/or recommendations going along with each valve may be viewed by activating the information button 40 seen in FIG. 3C. Activating this button 40 displays a valve information screen 105e such as seen in FIG. 3E. The valve information screen 105e presents valve identifying information 282 including that valve's flow rate. The valve information screen 105e also presents crop information 284 associated with that valve, including crop identifying information, time period associated with the growing and/or irrigation, and field size. The valve information screen 105e further presents irrigation recommendations 286 for that valve, for a predetermined following time period, such as the following 7-day window.

Figure 4:
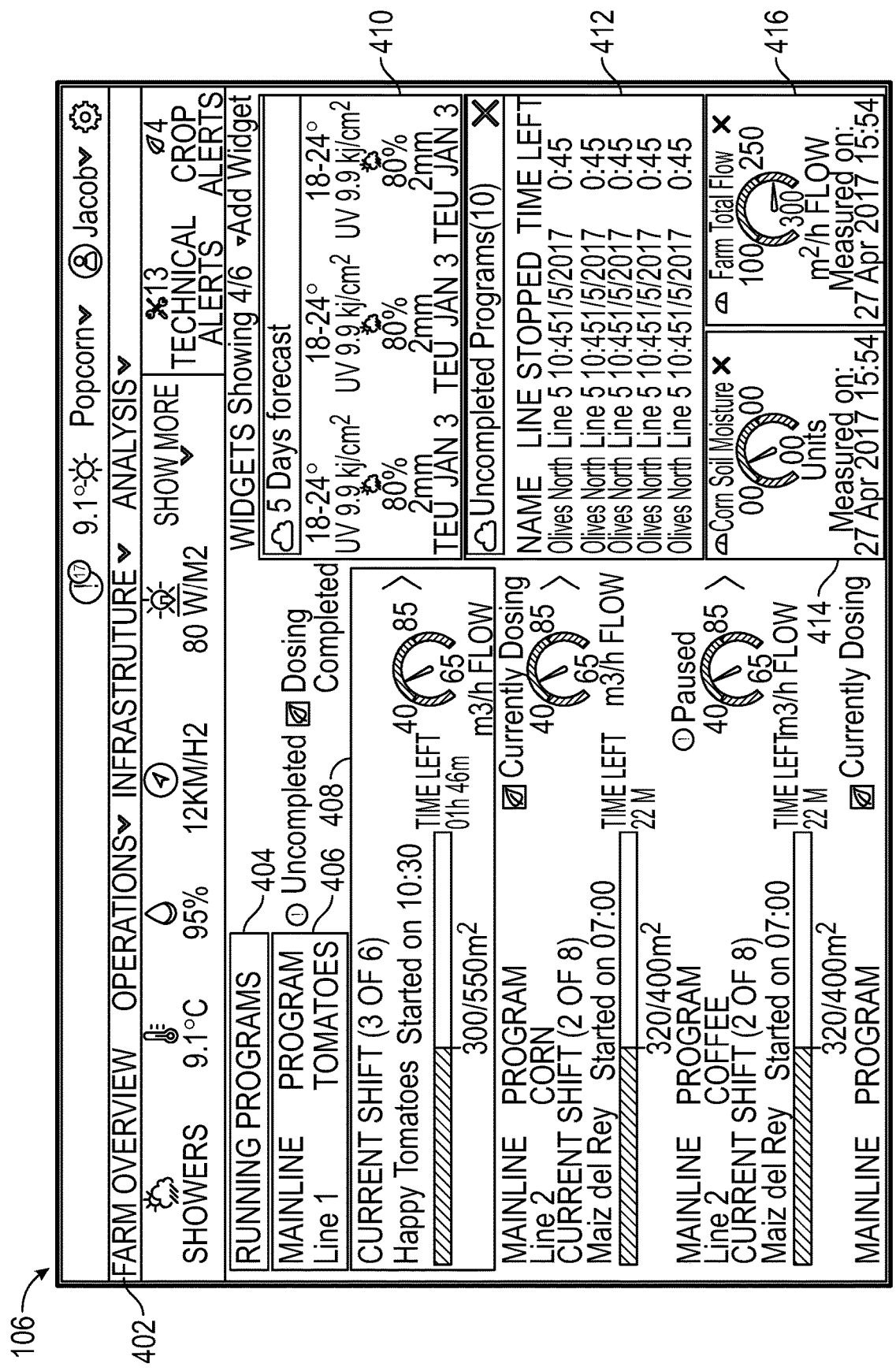
FIG. 4 shows a farm overview screen of the user interface.

Attention is drawn to FIG. 4 illustrating a farm overview screen 106, displayed in response to selecting the farm overview tab 402 from within upper ribbon 10 indicated in FIG. 1. In the view of FIG. 4, information about current irrigation programs 404 is made available to an operator. The information includes identifying information 406 which identifies the crop and the irrigation line, current program shift information 408 for each program, weather forecast information 410, incomplete program shift information 412, soil moisture information 414 and total farm flow rate information 416. Thus, the farm overview screen 106 enables an operator to instantly view information relating to various actions being controlled by the CMS. For example, information is provided pertaining to: irrigation programs currently running, weather forecast, uncompleted irrigation programs, dosing progress (and the like).

Figure 5A:
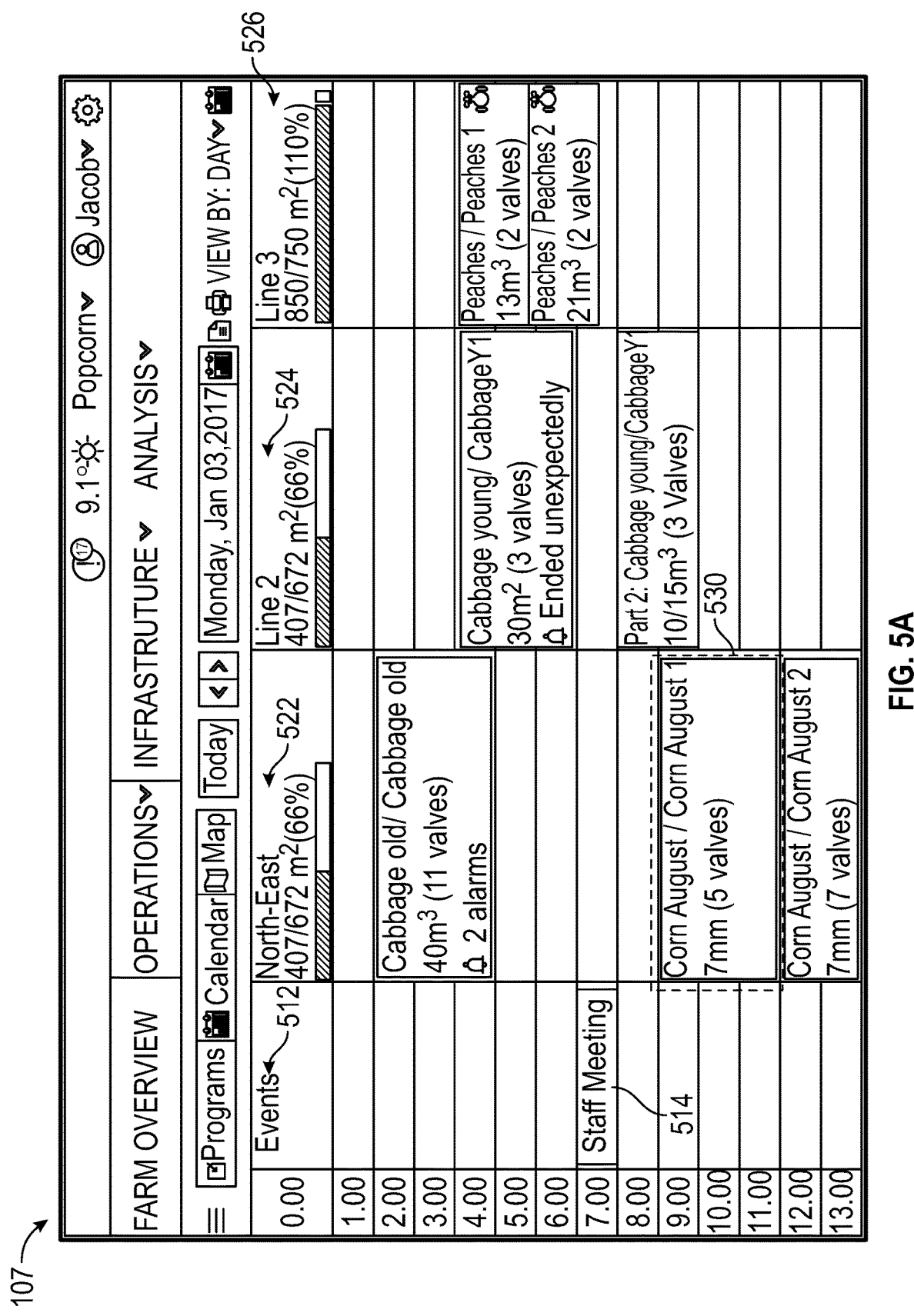
FIG. 5A shows a calendar screen of the user interface.

Attention is drawn to FIG. 5A illustrating a FIG. 5A illustrates calendar view 107, which is possibly available by selecting the 'operations' tab 502 from within upper ribbon 10 in FIG. 1. The calendar view 107 may display the hour-by-hour status of non-irrigation events together with irrigation events. The events may be organized as a plurality of columns, each column pertaining to a different event category. Thus, the calendar view 107 can include one or more columns 512, directed to non-irrigation event such as administrative events 514. The calendar view may also include one or more columns 522, 524, 526 directed to irrigation events, such as events associated with each irrigation line. The information within these irrigation line columns 522, 524, 526 may include program shift information identifying the name of the crop, the name of the program shift, the amount of water and/or nutrients being applied, the size of the field, and the number of valves involved, among other Generally speaking, however, irrigation actions may be illustrated according to irrigation lines and/or regions and/or blocks to which they relate and/or are dependent upon. In an aspect of the present invention, at least certain CMS embodiments are arranged to provide complementary information to an operator of the CMS so that he or she gains a broader view of e.g. a farm being irrigated.

Thus the 'calendar' view 107 of FIG. 5A and the 'map' view 105d of FIG. 3D are configured to complement each other, to provide a "multi-dimensional" view of the farm. In this example, the map 270 shows the farm in "spatial domain" (geographic) while the calendar shows the farm in "time domain" (chronologic). Some of the information such as alerts, may be shown in both views while other information may be shown only in the relevant domain, such as geographic location of a valve (shown only in the spatial domain) or shift duration (shown only in the time domain).

Figure 5B:
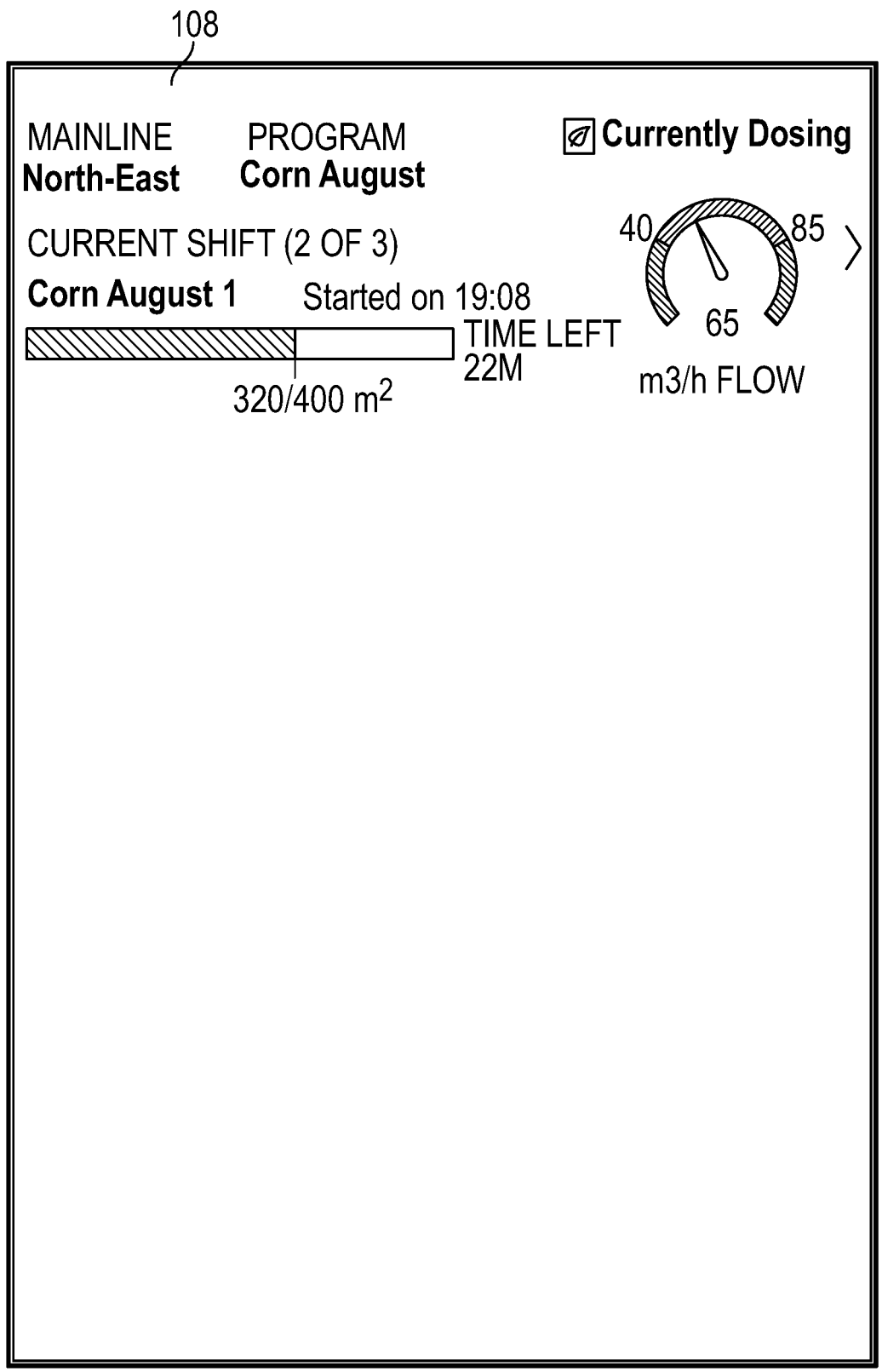
FIG. 5B shows detailed information for a calendar entry found in FIG. 5A.

Pointing to and thereby selecting a particular irrigation action such as that illustrated in FIG. 5A by the dashed box 530—may present information relating to progress of this particular irrigation action as illustrated in the irrigation action view 108 FIG. 5B.

Figure 6A:
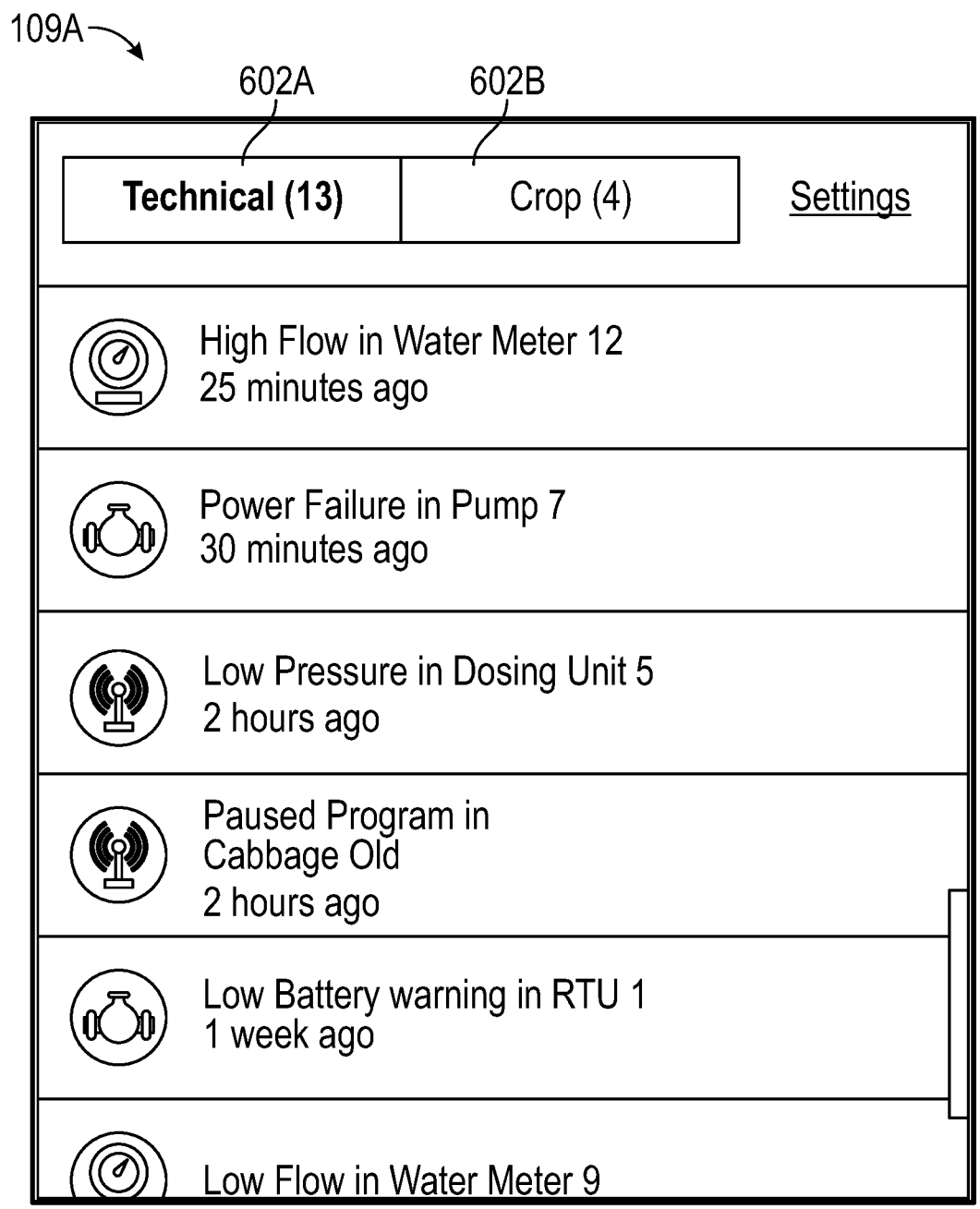
FIG. 6A shows a technical alert screen of the user interface.
Figure 6B:
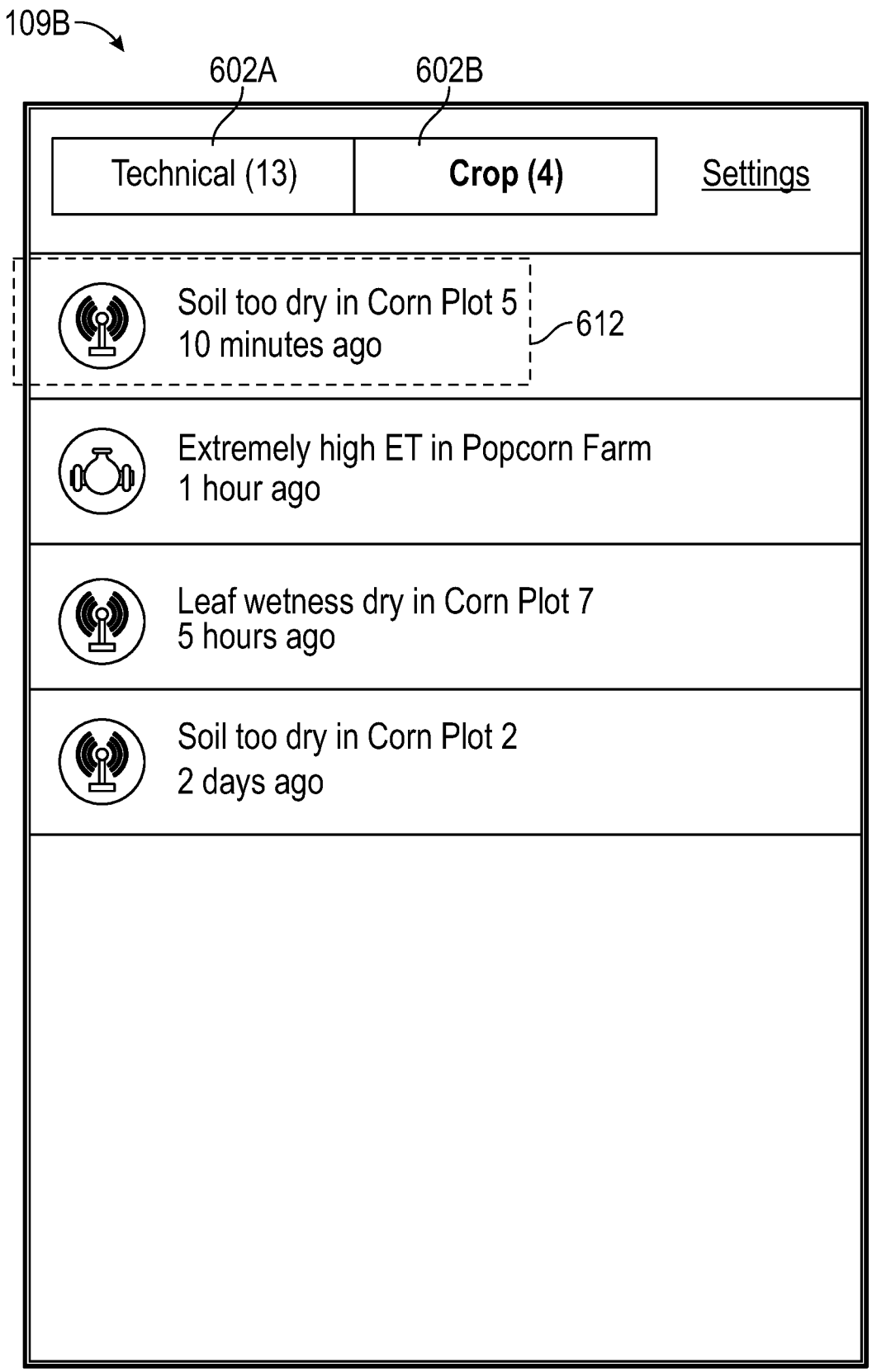
FIG. 6B shows a crop alert screen of the user interface.

Attention is drawn to FIGS. 6A and 6B illustrating examples of various alerts that a UI related to the CMS may provide. FIG. 6A shows a technical alerts screen 109A which is displayed in response to selecting technical alerts tab 602A. The technical alerts screen 109A displays one or more alerts concerning the equipment and/or software application comprising the CMS. FIG. 6B shows a crop alerts screen 109B which is displayed in response to selecting crop alerts tab 602B. The crop alerts screen 109B displays one or more alerts concerning crop conditions, soil conditions, weather conditions, and the like, as determined by various sensors that are deployed throughout the farm. An operator may "drill down" and view more details about a particular alert, such as alert 612 seen in FIG. 6B. In response to selecting the particular alert 612, as seen in FIG. 6C, an alert detail screen 109C is displayed, which present detailed information about the selected alert. The detailed information may include basic information 622 obtained principally from sensor data and database entries, and may optionally also include advanced information 624 obtained through AI-based heuristics reasoning.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

What is claimed is:

1. A user interface for a crop management system (CMS) for a farm, the farm being arranged to be fitted with one or more mainlines each configured to supply irrigation substances to one or more fields of the farm, each mainline comprising one or more valves and being configured to supply via valves(s) irrigation substances to a field via a network of secondary irrigation lines that branch off from the mainline wherein each such network being configured to deliver the irrigation substances to crops via one or more emitters and/or sprinklers, the user interface comprising:
a crop irrigation specification software component configured to accept first information as to what irrigation is to be performed, second information as to where irrigation is to be performed and third information as to when irrigation is to be performed, to thereby create a crop irrigation specification, the crop irrigation specification software component further configured to selectively accept a watering measurement method specified by each one of:
(a) watering depth;
(b) watering duration; and
(c) watering volume,
wherein the crop irrigation specification software component calculates a watering quantity by the accepted one of watering depth, watering duration, or watering volume; and
a download software component configured to download the crop irrigation specification to a main controller of an irrigation system.

2. The user interface according to claim 1, wherein the crop irrigation specification software component is further configured to accept information corresponding to a predefined dosing recipe along with specified durations for watering before and after applying dosing.

3. The user interface according to claim 2, wherein the crop irrigation specification software component is further configured to accept information corresponding to a newly specified dosing recipe.

4. The user interface according to claim 3, wherein:
the crop irrigation specification software component is configured to accept information reflective of:
(a) a first subset of valves associated with a given mainline being open for a first time period to irrigate at least a first portion of a field, and
(b) a second subset of valves associated with the same mainline being open for a subsequent, second time period to irrigate at least a second portion of said field, to thereby ensure that a maximum water flow rate of the mainline is not exceeded.

5. The user interface according to claim 4, wherein:
the crop irrigation specification software component is configured to display one or more of
(a) the already-assigned water flow rate of the mainline;
(b) the available water flow rate of the mainline; and
(c) the maximum water flow rate of the mainline.

6. The user interface according to claim 5, further comprising:
a map display software component configured to depict a geographical area of at least one field being irrigated along with current flow rates of valves configured to irrigate the depicted geographical area.

7. The user interface according to claim 6, further comprising:
a watering recommendation software component configured to recommend quantities of water to be supplied to a particular field, or portion thereof, for a predetermined time period.

8. The user interface according to claim 7, further comprising:
a farm status software component configured to display current information regarding crops and fields being irrigated.

9. The user interface according to claim 8, further comprising:
a calendar software component configured to simultaneously display an hour-by-hour irrigation schedule for a plurality of mainlines of the farm.

10. The user interface according to claim 9, further comprising:
an alerts software component configured to selectively display technical alerts pertaining to equipment and crop alerts pertaining to crops under irrigation.

* * * * *